(12) United States Patent
Sarkar

(10) Patent No.: US 8,516,189 B2
(45) Date of Patent: Aug. 20, 2013

(54) SOFTWARE TECHNIQUE FOR IMPROVING DISK WRITE PERFORMANCE ON RAID SYSTEM WHERE WRITE SIZES ARE NOT AN INTEGRAL MULTIPLE OF NUMBER OF DATA DISKS

(75) Inventor: Tirthendu Sarkar, Karnataka (IN)

(73) Assignee: LSI Corporation, Milpitas, CA (US)

( * ) Notice: Subject to any disclaimer, the term of this patent is extended or adjusted under 35 U.S.C. 154(b) by 730 days.

(21) Appl. No.: 12/211,138

(22) Filed: Sep. 16, 2008

(65) Prior Publication Data

US 2010/0070703 A1 Mar. 18, 2010

(51) Int. Cl.
*G06F 12/00* (2006.01)

(52) U.S. Cl.
USPC ..... 711/114; 711/155; 711/216; 711/E12.001

(58) Field of Classification Search
USPC ............................ 711/114, 155, E12.001, 216
See application file for complete search history.

(56) References Cited

U.S. PATENT DOCUMENTS

| | | | | |
|---|---|---|---|---|
| 4,398,243 A | * | 8/1983 | Holberger et al. | 712/211 |
| 4,434,459 A | * | 2/1984 | Holland et al. | 712/210 |
| 5,446,855 A | * | 8/1995 | Dang et al. | 711/1 |
| 5,754,888 A | * | 5/1998 | Yang et al. | 710/52 |
| 6,704,837 B2 | * | 3/2004 | Beardsley et al. | 711/114 |
| 7,099,913 B1 | * | 8/2006 | Bertone et al. | 709/202 |
| 7,870,351 B2 | * | 1/2011 | Resnick | 711/155 |
| 2003/0120869 A1 | * | 6/2003 | Lee et al. | 711/135 |
| 2004/0044877 A1 | * | 3/2004 | Myers | 712/11 |
| 2007/0091500 A1 | * | 4/2007 | Manasse | 360/75 |

* cited by examiner

*Primary Examiner* — Mardochee Chery
(74) *Attorney, Agent, or Firm* — Raj Abhyanker, P.C.

(57) ABSTRACT

A method, apparatus, and system of a software technique for improving disk write performance on raid system where write sizes are not an integral multiple of number of data disks are disclosed. In one embodiment, a method includes configuring a queue module to place an amount of data of a write operation into a data buffer module associated with a memory system if writing the amount of data to the memory system would generate a read-modify-write operation to occur, using the data buffer module to temporarily store the amount of data, writing the amount of data from the data buffer module to the memory system. The method may include algorithmically determining the amount of data to place in the data buffer module as a portion of the write operation that may cross a boundary between a striped sector unit (SSU) and/or an other SSU.

20 Claims, 7 Drawing Sheets

SOFTWARE TECHNIQUE FOR IMPROVING DISK WRITE PERFORMANCE ON RAID SYSTEM WHERE WRITE SIZES ARE NOT AN INTEGRAL MULTIPLE OF NUMBER OF DATA DISKS

FIELD OF TECHNOLOGY

This disclosure relates generally to an enterprise method, a technical field of software and/or hardware technology and, in one example embodiment, to a software technique for improving disk write performance on raid system where write sizes are not an integral multiple of number of data disks.

BACKGROUND

An amount of data may be written to a redundant array of independent disks (RAID) (e.g., a system of multiple hard drives for sharing, storing and/or replicating data). The data disk may be divided into sectors (e.g., a minimum addressable read and/or write size). The granularity of read and/or write size to the RAID may be a stripe sector unit (SSU) (e.g., a set of sectors collected one from each data disk of the RAID) that may contain a fixed number of sectors.

The amount of data of the write operation may be greater than a single SSU. Also, the amount of data may require a number of sectors that is not a multiple of the number of sectors of the SSU. Consequently, the write operation may cross a boundary between a SSU and an other SSU. A portion of the amount of data of the write operation may be partially written into the other SSU. When this occurs, a read-modify-write (RMW) operation (e.g., a sequence of operations that may be performed when a set of data is read, modified and rewritten to a location) may be initiated. The RMW may require resources and slow the throughput (e.g. a rate of data delivery) rate of the RAID.

SUMMARY

A method, apparatus, and system of a software technique for improving disk write performance on raid system where write sizes are not an integral multiple of number of data disks are disclosed. In one aspect, a method includes configuring a queue module to place an amount of data of a write operation into a data buffer module associated with a memory system if writing the amount of data to the memory system would generate a read-modify-write operation to occur, using the data buffer module to temporarily store the amount of data, and writing the amount of data from the data buffer module to the memory system.

The memory system may be a redundant array of independent disks (RAID) module. The data buffer module may be a software cache module. The software cache module may be implemented as a hash table. The RAID module may have a striped sector unit value that may not be a multiple of a number of sectors of the write operation.

The method may include algorithmically determining the amount of data to place in the data buffer module as a portion of the write operation that may cross a boundary between a striped sector unit (SSU) and/or an other SSU. The method may also include determining a presence of the amount of data in the data buffer module when an other write operation may be in the queue module. The method may append the amount of data in the data buffer module to the other write operation. The amount of data may be appended to the beginning of the other write operation and/or an end of the other write operation.

The amount of data may be written to the memory system if a read request occurs for the amount of data while it may be temporarily stored in the data buffer module. The method may include examining the amount of data in the data buffer module for a set of data that may duplicate an other set of data of the other write operation. In addition, the method may discard the set of data that duplicates the other set of data of the other write operation. The memory system may be a single-disk system. Multiple write operations to a single sector may be temporarily stored in the data buffer module until a full sector may be gathered. A single write operation containing the data of the write operations may be performed to the memory system when the full sector is gathered.

In another aspect, a system includes a redundant array of independent disks (RAID) module, a queue module associated with the redundant array of independent disks (RAID) module to place an amount of data of a write operation in a data buffer module if writing the amount of data to the RAID module would cause the write operation to overlap an interface between a striped sector unit (SSU) of the RAID module and an other SSU of the RAID module, the data buffer module associated with the RAID module to temporarily store the amount of data from the queue module, and a write module to write the amount of data temporarily stored in the data buffer module to the RAID module.

The write module may write the amount of data temporarily stored in the data buffer module to a single SSU of the RAID module. The data buffer module may use a software cache implemented as a hash table to store the amount of data. The RAID module may have a number of data disks that may not divide the sectors to be written integrally. The write module may append a data from the data buffer module is appended to an other write operation. The amount of data may be written to the memory system if a read request occurs for the amount of data while it may be temporarily stored in the data buffer module. The amount of data may be written to the memory system if a read request occurs for the amount of data while it may be temporarily stored in the data buffer module.

The system may include a de-duplicator module to examine the data buffer module for a set of data that duplicates an other set of data of the other write operation. In addition, the system may include a removal module to discard the set of data that duplicates the other set of data of the other write operation. The system may also include the redundant array of independent disks (RAID) module has a single data disk. Write operations to a single sector may be temporarily stored in the data buffer module until a full sector may be gathered. A single write operation may be performed when the full sector is gathered.

In yet another aspect, a method includes determining if a portion of a data write overlaps an interface between a striped sector unit (SSU) to a redundant array of independent disks (RAID) and an other SSU of the RAID, temporarily storing the portion of a data write that overlaps the interface into a software cache, and appending the portion of the data write in the software cache to an other data write.

The method may include determining if a portion of the other data write overlaps an other interface between the other SSU to the RAID and/or an additional SSU of the RAID. In addition, the method may temporarily store the portion of the other data write that overlaps the other interface into the software cache. The method may also append the portion of the other data write in the software cache to an additional data write.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus, and system of a software technique for improving disk write performance on raid system where write sizes are not an integral multiple of number of data disks are disclosed. Although the present embodiments have been described with reference to specific example embodiments, it will be evident that various modifications and changes may be made to these embodiments without departing from the broader spirit and scope of the various embodiments.

Figure 1:
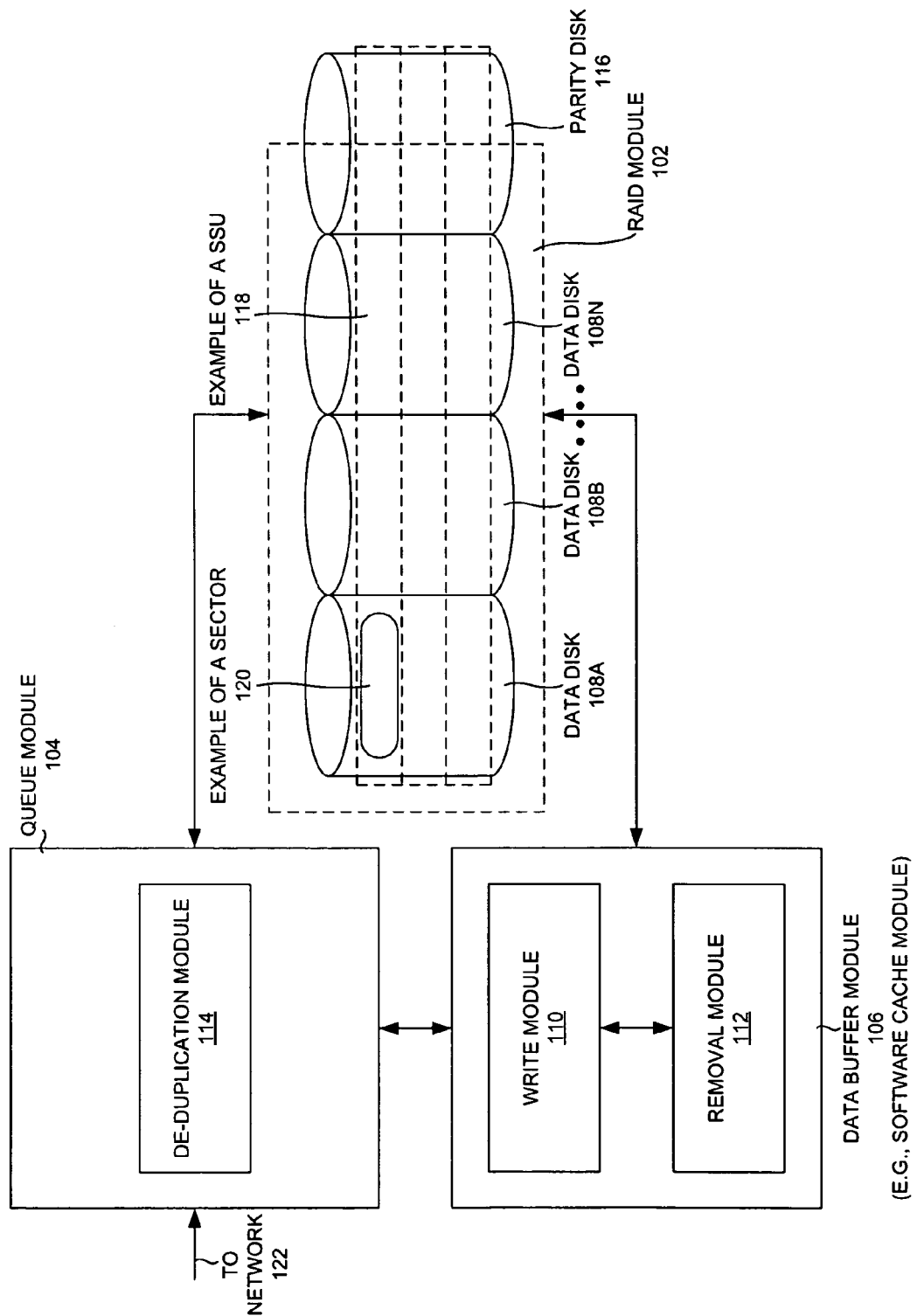
FIG. 1 is a system view of data buffer module 106 communicating with the queue module and the RAID module to avoid read-modify-write (RMW) operation, according to one embodiment.

In one embodiment, a method includes configuring a queue module (e.g., the queue module 104 of FIG. 1) to place an amount of data of a write operation into a data buffer module (e.g., the data buffer module 106 of FIG. 1) associated with a memory system (e.g., may be the RAID module 102 of FIG. 1) if writing the amount of data to the memory system (e.g., using the write module 110 of FIG. 1) would generate a read-modify-write operation to occur, using the data buffer module 106 to temporarily store the amount of data, writing the amount of data from the data buffer module 106 to the memory system (e.g., may be the RAID module 102 of FIG. 1).

In another embodiment, a system includes a redundant array of independent disks (RAID) module (e.g., the redundant array of independent disks (RAID) module 102 of FIG. 1), a queue module (e.g., the queue module 104 of FIG. 1) associated with the redundant array of independent disks (RAID) module 102 to place an amount of data of a write operation in a data buffer module (e.g., the data buffer module 106 of FIG. 1) if writing the amount of data to the RAID module 102 would cause the write operation to overlap an interface between a striped sector unit (SSU) (e.g., the striped sector unit (SSU) 118 of FIG. 1) of the RAID module 102 and an other SSU of the RAID module 102, the data buffer module 106 associated with the RAID module 102 to temporarily store the amount of data from the queue module 104, and a write module (e.g., the write module 110 of FIG. 1) to write the amount of data temporarily stored in the data buffer module 106 to the RAID module 102.

In yet another embodiment, a method includes determining if a portion of a data write overlaps an interface between a striped sector unit (SSU) (e.g., the striped sector unit (SSU) 118 of FIG. 1) to a redundant array of independent disks (RAID) and an other SSU of the RAID, temporarily storing the portion of a data write that overlaps the interface into a software cache, and appending the portion of the data write in the software cache to an other data write (e.g., using the data buffer module (e.g., the software cache module) 106 of FIG. 1).

FIG. 1 is a system view of data buffer module 106 communicating with the queue module and the RAID module to avoid read-modify-write (RMW) operation, according to one embodiment. Particularly, FIG. 1 illustrates a RAID module 102, a queue module 104, a data buffer module (e.g., software cache module) 106, a data disk 108A-N, a write module 110, a removal module 112, a de-duplication module 114, a parity disk 116, a SSU 118, a sector 120, and network 122, according to one embodiment.

The RAID module 102 may be the memory system (e.g., hard disk, server, etc.) that may have a striped sector unit (SSU), and data disks (e.g., in the raid module 102) may receive the data from the sources (e.g., may be from network, from the data buffer, etc.). The queue module 104 (e.g., temporary stack, accumulator, etc.) may be a module that may be associated with the RAID module 102 which may place an amount of data of a write operation (e.g., temporarily) in the data buffer module 106. The data buffer module (e.g., software cache module) 106 may be associated with the RAID module 102 that may temporarily store the amount of data (e.g., that may be required to avoid RMW) from the queue module 104.

The data disk 108A-N may be the disk (e.g., may be divided into sectors) in which the data arrives from the source (e.g., network, etc.) into the preprogrammed hardware queues and from there it may directly written to the disk (e.g., may be the RAID). The write module 110 may be the module that may write the amount of data which may be temporarily stored in the data buffer module 106 to the RAID module 102. The removal module 112 may be the module that may remove the set of data which may duplicate the other set of data of the other write operation. The de-duplication module 114 may examine the data buffer module for 106 the set of data that may duplicate the other set of data of the other write operation.

The parity disk 116 may be a part of RAID module 102 that may store the parity data that may be generated from the special operation (e.g., that may be specific to the particular RAID technology like the XOR operation, etc.) which may be used to generate the lost or corrupted data. The SSU (Stripe Sector Unit) 118 may be a set of memory location (e.g., part of a sector) that may be collected from each disk array drive (e.g., for a 4-disk RAID5 system the SSU may be 3, etc.) for storing the data logically. The sector 120 may be the addressable (e.g., read-write) size of memory locations (e.g., may be like 512 Bytes) that may be used to address the memory locations to store the data logically. The network 122 may be communication system that may enable the devices that are connected (e.g., may be wired or wireless) to communicate with each other through a medium (e.g., LAN, WAN, Bluetooth, WiFi, ZigBee, etc.).

In example embodiment, the RAID module 102 may include the data disk 108A-N, the parity disk 116, the SSU 118, and the sector 120. The queue module 104 that may include the de-duplication module may place an amount of data of a write operation into the data buffer module 106. The data buffer module (e.g., software cache module) 106 that includes the write module 110 and the removal module 112. The removal module 112 may temporarily store the amount of data. The RAID module 102 may be connected to the queue module 104, and the data buffer module (e.g., software cache module) 106 to avoid RMW (Read-Modify-Write).

In one embodiment, the queue module 104 may be configured to place the amount of data of the write operation into the data buffer module 106 associated with the memory system (e.g., may be the RAID module 102 of FIG. 1) if writing the amount of data to the memory system may generate the read-modify-write operation to occur. The data buffer module 106 may be used to temporarily store the amount of data. The amount of data may be written from the data buffer module 106 to the memory system.

The memory system (e.g., may be the RAID module 102 of FIG. 1) may be the redundant array of independent disks (RAID) module 102. The data buffer module 106 may be the software cache module. The software cache module (e.g., may be the data buffer module 106 of FIG. 1) may be implemented as the hash table. The RAID module 102 has the striped sector unit value that may not be the multiple of the number of sectors of the write operation. The amount of data may be algorithmically determined to place in the data buffer module 106 as the portion of the write operation that would cross the boundary between the striped sector unit (SSU) 118 and the other SSU. The presence of the amount of data may be determined in the data buffer module 106 when the other write operation is in the queue module 104.

The amount of data may be appended in the data buffer module 106 to the other write operation. The amount of data may be appended to the beginning of the other write operation and/or the end of the other write operation. The amount of data may be written to the memory system (e.g., using the write module 110 of the data buffer module 106 as illustrated in FIG. 1) if the read request occurs for the amount of data while it may be temporarily stored in the data buffer module 106. The amount of data may be examined in the data buffer module 106 for the set of data that duplicates the other set of data of the other write operation (e.g., using the de-duplication module 114 of the queue module 104 of FIG. 1).

The set of data that duplicates the other set of data of the other write operation may be discarded. The memory system may be the single-disk system. The write operations to the single sector may be temporarily stored in the data buffer module 106 until the full sector is gathered. The single write operation containing the data of the write operations may be performed to the memory system (e.g., may be the RAID module 102 of FIG. 1) when the full sector is gathered.

The queue module 104 associated with the redundant array of independent disks (RAID) module 102 may place the amount of data of the write operation in the data buffer module 106 if writing the amount of data to the RAID module 102 may cause the write operation to overlap the interface between the striped sector unit (SSU) 118 of the RAID module 102 and/or the other SSU of the RAID module 102. The data buffer module 106 associated with the RAID module 102 may temporarily store the amount of data from the queue module 104. The write module 110 may write the amount of data temporarily stored in the data buffer module 106 to the RAID module 102.

The write module 110 may write the amount of data temporarily stored in the data buffer module 106 to the single SSU of the RAID module 102. The data buffer module 106 may use the software cache implemented as the hash table to store the amount of data. The RAID module 102 may have the number of data disks 108A-N. The write module 110 appends the data from the data buffer module 106 may be appended to the other write operation. The amount of data may be written to the memory system if the read request occurs for the amount of data while it may be temporarily stored in the data buffer module 106. The amount of data may be written to the memory system if the read request occurs for the amount of data while it may be temporarily stored in the data buffer module 106.

The de-duplication module 114 may examine the data buffer module 106 for the set of data that duplicates the other set of data of the other write operation. The removal module 112 may discard the set of data that duplicates the other set of data of the other write operation. The redundant array of independent disks (RAID) module 102 may have the single data disk. The write operations to the single sector may be temporarily stored in the data buffer module 106 until the full sector is gathered. The single write operation may be performed when the full sector is gathered.

It may be determined if the portion of the data write overlaps the interface between the striped sector unit (S SU) 118 to the redundant array of independent disks (RAID) and the other SSU of the RAID. The portion of the data write that overlaps the interface may be temporarily stored into the software cache (e.g., using the data buffer module (e.g., the software cache module) 106 of FIG. 1). The portion of the data write (e.g., may be the data write A (e.g., data write) 204A of FIG. 2) in the software cache may be appended to the other data write (e.g., may be the data write B (e.g., the another data write) 204B of FIG. 2). It may be determined if the portion of the other data write overlaps the other interface between the other SSU to the RAID and the additional SSU of the RAID. The portion of the other data write 204B that overlaps the other interface may be temporarily stored into the software cache. The portion of the other data write 204B in the software cache may be appended to the additional data write.

Figure 2:
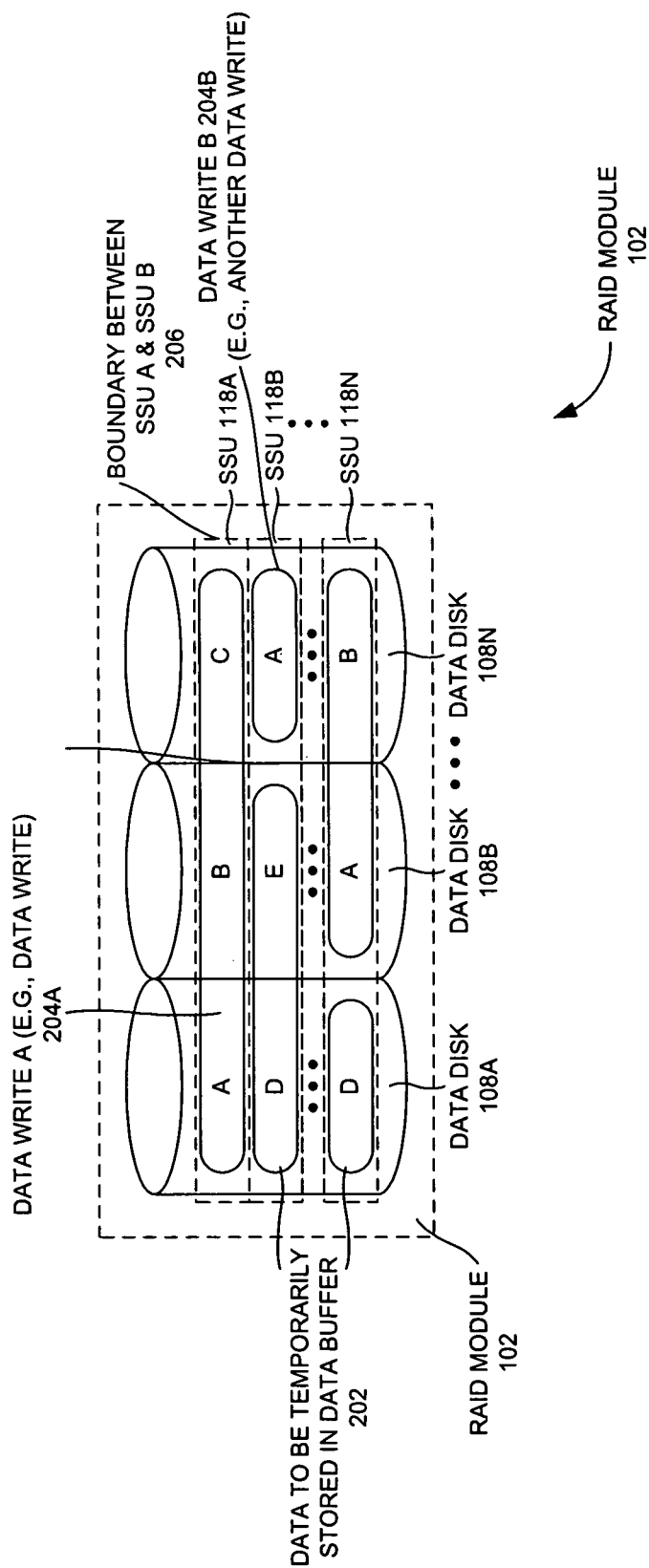
FIG. 2 is an exploded view of a data disk of a RAID system, according to one embodiment.

FIG. 2 is an exploded view of the data disk of a RAID system, according to one embodiment. Particularly, FIG. 2 illustrates the RAID module 102, the data disk 108A-N, the SSU 118A-N, a data to be temporarily stored in data buffer 202, a data write A (e.g., data write) 204A, a data write (e.g., another data write) 204B, and a boundary between SSU A & SSU B 206, according to one embodiment.

The data to be temporarily stored in data buffer 202 may be the amount of data that may be temporarily stored in the data buffer module until the full stripe may be gathered for the performance of the write operation to the memory system (e.g., may be the RAID module). The data write A (e.g., data write) 204A may be a set of data packets (e.g., 'A' as illustrated in FIG. 2) that may be written into the data disk 108A. The data write B (e.g., another data write) 204B may be a set of data packets (e.g., 'A' as illustrated in FIG. 2) that may be written into the data disk 108N that may be a start of data writing for next continuous set of data packets. The boundary between SSU A & SSU B 206 may be gap between the two SSU's (e.g., that may cause RMW).

In example embodiment, the RAID module 102 may include the data disk 108A-N, and the SSU 118A-N. The data disk 108A-N may include the data to be temporarily stored in data buffer 202 (e.g., D, D, E, A, etc.), the data write A (e.g., data write) 204A (e.g., A, B, C, etc.), and the data write (e.g., another data write) 204B (e.g., A, etc.). The RAID module 102 may include the SSU 118A-N.

Figure 3:
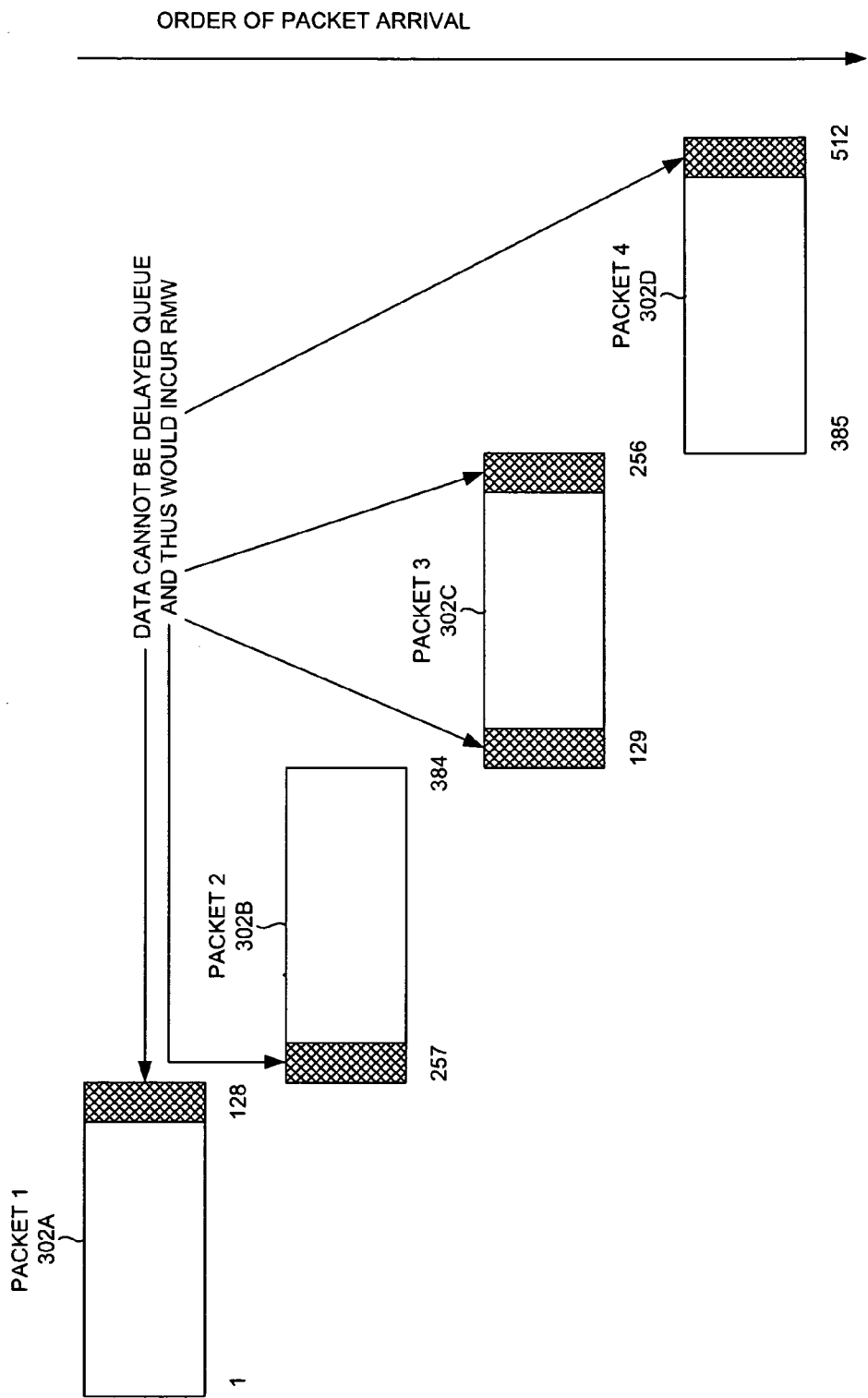
FIG. 3 is a system view illustrating a data on queue in order of arrival when the packet arrives that has to be written into the memory locations in RAID module, according to one embodiment.

FIG. 3 is a system view illustrating a data on queue in order of arrival when the packet arrives that has to be written into the memory locations in RAID module, according to one embodiment. Particularly, FIG. 3 illustrates a packet 1-4 302A-D, according to one embodiment.

The packet 1-4 302A-D may be a logical group (e.g., large data broken into small units for transmitting over network) of data (e.g., may be the amount of data that the application may transfer in one request) of a certain size in bytes (e.g., the data may be written is 64 KB (Kilo Byte) in size).

In example embodiment, FIG. 3 illustrates incoming data packets that may have to be stored in the memory locations. A part of data cannot be directly written into the memory locations as that may cause the data in the previous memory location to be completely erased and thus the RMW procedure is followed. The FIG. 3 may also illustrate the example embodiment, where the data packets coming from the sources (e.g., network) are written into the memory locations. The Figure also illustrates the part of data that may cause the RMW operation that may hamper the performance of the system dependent on it.

Figure 4:
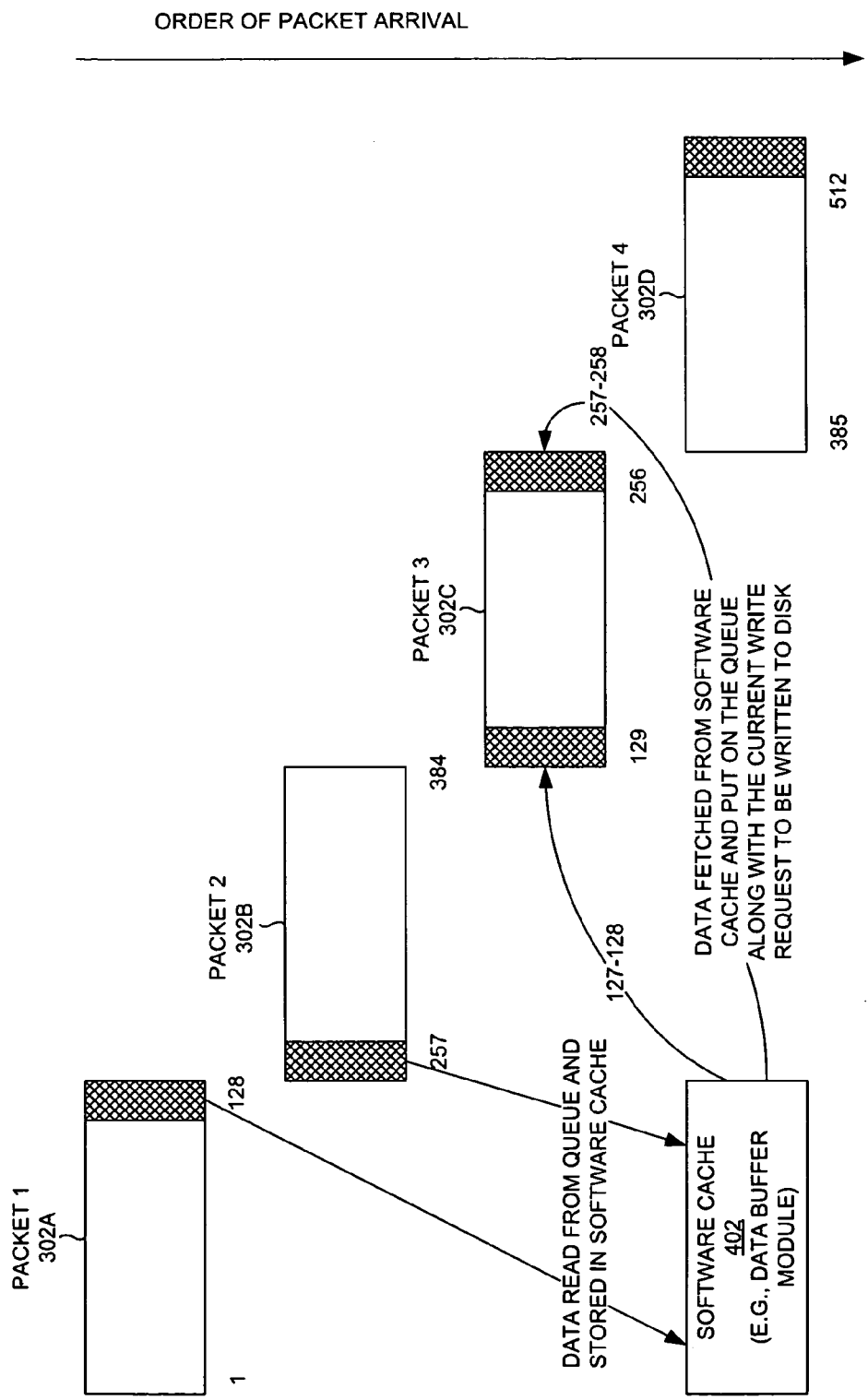
FIG. 4 is a system view illustrating storing portions of data in a software cache and later retrieving them to be written along with contiguous data to avoid the RMW, according to one embodiment.

FIG. 4 is a system view illustrating storing portions of data in a software cache and later retrieving them to be written along with contiguous data to avoid the RMW, according to one embodiment. Particularly, FIG. 4 illustrates the packet 1-4 302A-D, and a software cache (e.g., data buffer module) 402, according to one embodiment.

The software cache (e.g., data buffer module) 402 (e.g., may be a temporary storage location implemented through software) may be used by the data buffer module 106 to implement a hash table that may store the amount of data and connect the portion of data write to the other data write.

In example embodiment, the packet 1 302A of 64 KB (e.g., 128 sectors start at sector 1). Out of these, 126 sectors may be written to disks without any RMW. The writing sectors 127 and 128 may incur RMW as they may partially fill the SSU. So they may read from the queue and stored in a software cache which may be implemented as a hash table. The packet 2 302B of 64 KB consists of sectors 257 to 384. Sectors 257 and 258 may partially fill the SSU and hence may be stored in the cache. The rest of sectors (259 to 384) may be written to the disks without any RMW. The packet 3 302C consists of sectors 129 to 256. At this point sectors 127 and 128 may be fetched from the cache and written before the current data (e.g., may be before data of sector 129), and the sectors 257 and 258 may be fetched and written after current data (e.g., after data of sector 256. So now sectors 127 to 258 may be written to disks without any RMW).

Figure 5:
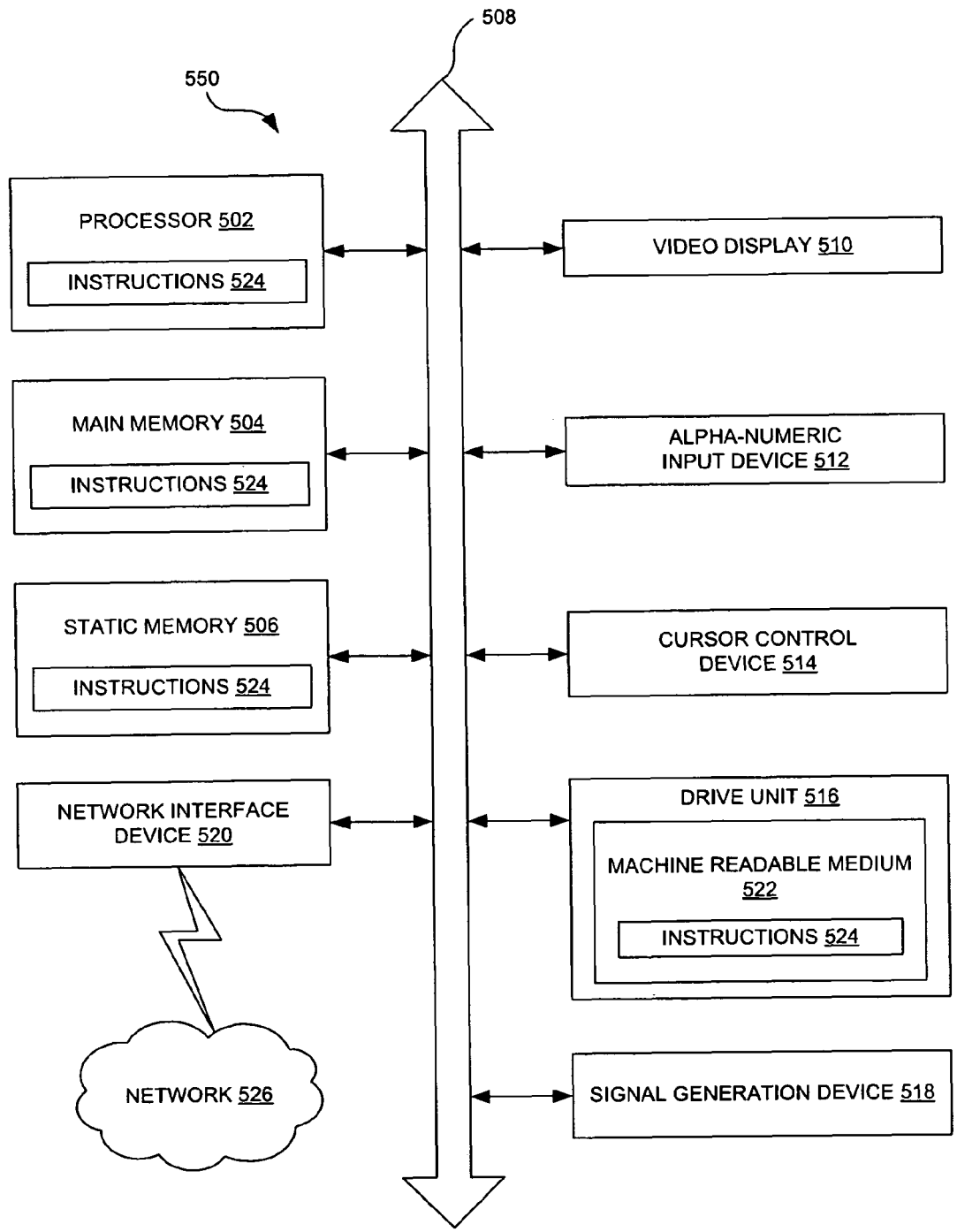
FIG. 5 is a diagrammatic system view 500 of a data processing system in which any of the embodiments disclosed herein may be performed, according to on embodiment.

FIG. 5 is a diagrammatic system view 500 of a data processing system in which any of the embodiments disclosed herein may be performed, according to one embodiment. Particularly, the diagrammatic system view 500 of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524, and a network 526, according to one embodiment.

The diagrammatic system view 500 may indicate a personal computer and/or the data processing system in which one or more operations disclosed herein are performed. The processor 502 may be a microprocessor, a state machine, an application specific integrated circuit, a field programmable gate array, etc. (e.g., Intel® Pentium® processor). The main memory 504 may be a dynamic random access memory and/or a primary memory of a computer system.

The static memory 506 may be a hard drive, a flash drive, and/or other memory information associated with the data processing system. The bus 508 may be an interconnection between various circuits and/or structures of the data processing system. The video display 510 may provide graphical representation of information on the data processing system. The alpha-numeric input device 512 may be a keypad, a keyboard and/or any other input device of text (e.g., a special device to aid the physically handicapped).

The cursor control device 514 may be a pointing device such as a mouse. The drive unit 516 may be the hard drive, a storage system, and/or other longer term storage subsystem. The signal generation device 518 may be a bios and/or a functional operating system of the data processing system. The network interface device 520 may be a device that performs interface functions such as code conversion, protocol conversion and/or buffering required for communication to and from the network 526. The machine readable medium 522 may provide instructions on which any of the methods disclosed herein may be performed. The instructions 524 may provide source code and/or data code to the processor 502 to enable any one or more operations disclosed herein.

Figure 6:
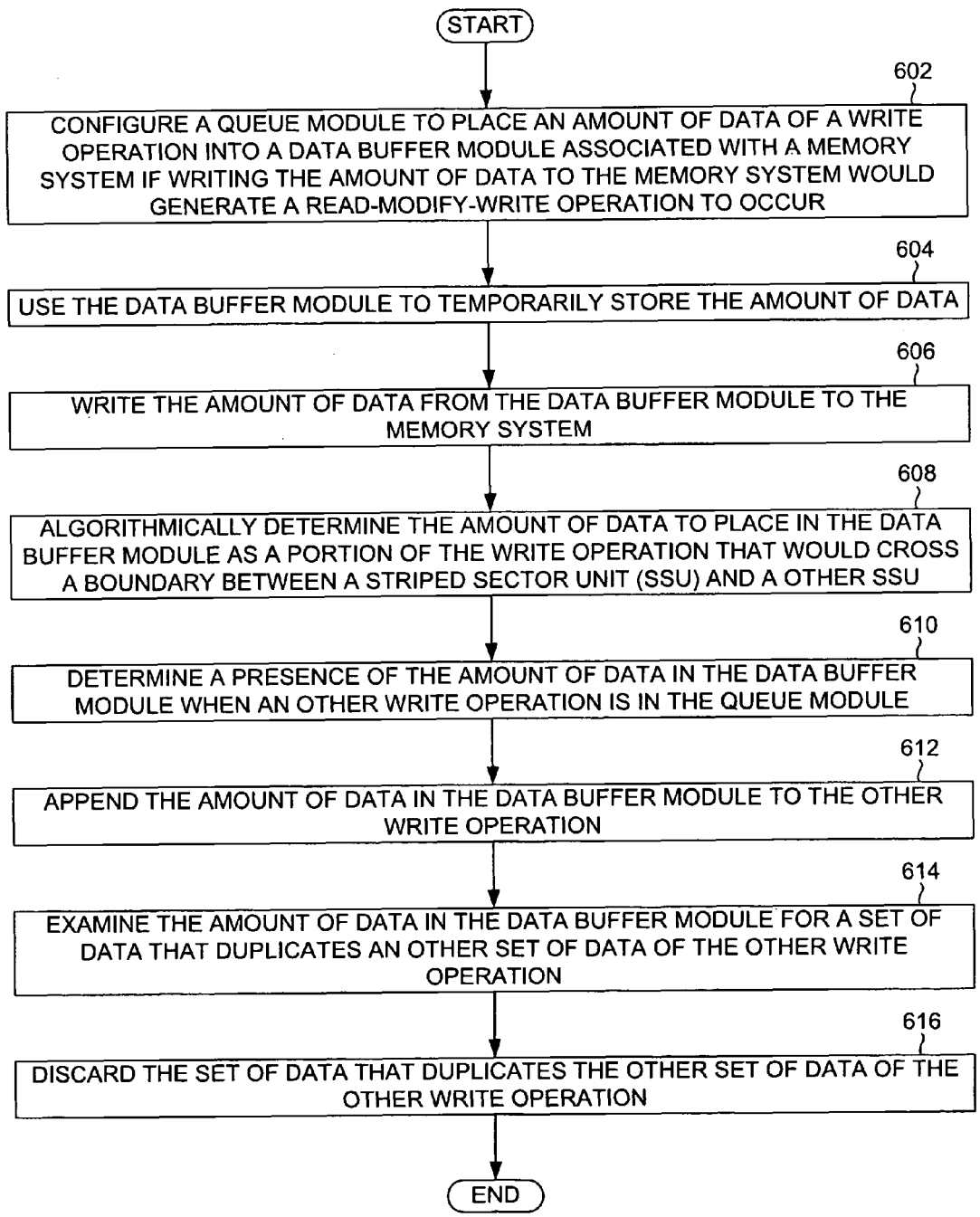
FIG. 6 is a process flow of configuring a queue module to place an amount of data of a write operation into a data buffer module associated with a memory system, according to one embodiment.

FIG. 6 is a process flow of configuring a queue module (e.g., the queue module 104 of FIG. 1) to place an amount of data of a write operation into a data buffer module (e.g., the data buffer module 106 of FIG. 1) associated with a memory system (e.g., may be the RAID module 102 of FIG. 1), according to one embodiment. In operation 602, the queue module 104 may be configured to place an amount of data of a write operation into the data buffer module 106 associated with the memory system (e.g., may be the RAID module 102 of FIG. 1) if writing the amount of data to the memory system may generate a read-modify-write operation to occur. In operation 604, the data buffer module 106 may be used to temporarily store the amount of data. In operation 606, the amount of data may be written from the data buffer module 106 to the memory system (e.g., may be the RAID module 102 of FIG. 1).

The memory system may be a redundant array of independent disks (RAID) module 102. The data buffer module 106 may be a software cache module. The software cache module may be implemented as a hash table. The RAID module 102 may have a striped sector unit value that may not be a multiple of a number of sectors of the write operation.

In operation 608, the amount of data may be algorithmically determined to place in the data buffer module 106 as a portion of the write operation that may cross a boundary between a striped sector unit (SSU) and a other SSU (e.g., may be the boundary between a striped sector unit (SSU) and a other SSU 206 of FIG. 2). In operation 610, a presence of the amount of data may be determined in the data buffer module 106 when an other write operation is in the queue module 104. In operation 612, the amount of data may be appended in the data buffer module 106 to the other write operation. The amount of data may be appended to the beginning of the other write operation and/or an end of the other write operation. The amount of data may be written to the memory system if a read request occurs for the amount of data while it may be temporarily stored in the data buffer module 106.

In operation 614, the amount of data may be examined in the data buffer module 106 for a set of data that duplicates an other set of data of the other write operation. In operation 616, the set of data that duplicates the other set of data of the other write operation may be discarded. The memory system may be a single-disk system. A write operation to a single sector may be temporarily stored in the data buffer module 106 until a full sector is gathered. A single write operation containing the data of the write operations may be performed to the memory system when the full sector is gathered.

Figure 7:
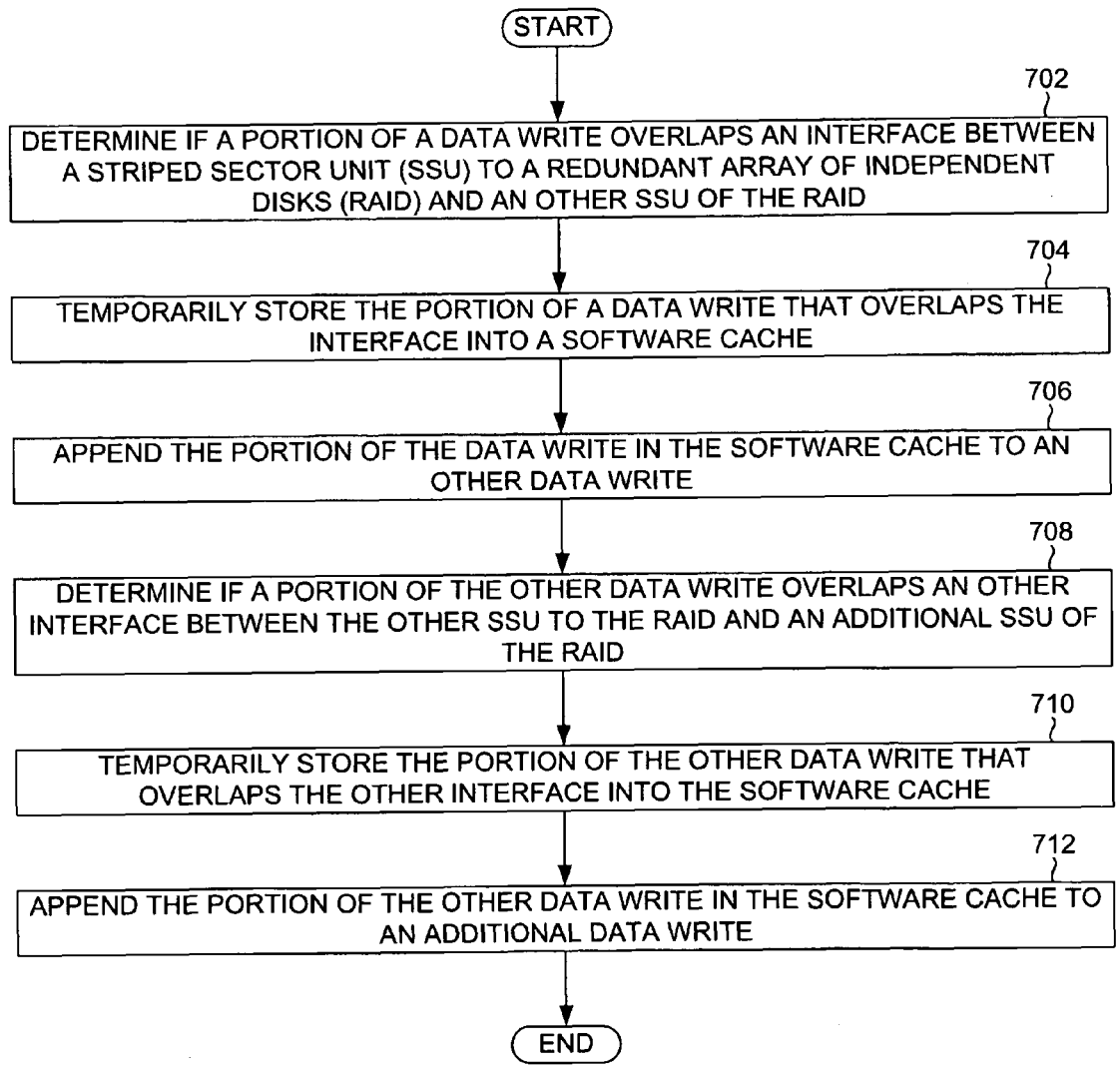
FIG. 7 is a process flow of determining if a portion of a data write overlaps an interface between a striped sector unit (SSU) to a redundant array of independent disks (RAID), according to one embodiment.

FIG. 7 is a process flow of determining if a portion of a data write (e.g., may be the data drive A (e.g., data write) 204A, and the data write (e.g., another data write) 204B of FIG. 2) overlaps an interface between a striped sector unit (SSU) (e.g., the striped sector unit (SSU) 118 of FIG. 1) to a redundant array of independent disks (RAID) (e.g., the redundant array of independent disks (RAID) 102 of FIG. 1), according to one embodiment. In operation 702, it may be determined (e.g., using the queue module 104 of FIG. 1) if a portion of a data write overlaps an interface between the striped sector unit (SSU) to a redundant array of independent disks (RAID) and an other SSU of the RAID. In operation 704, the portion of the data write that overlaps the interface may be temporarily stored into a software cache (e.g., using the data buffer module (e.g., software cache module) 106 of FIG. 1). In operation 706, the portion of the data write in the software cache may be appended (e.g., using the write module 110 of FIG. 1) to an other data write.

In operation 708, it may be determined (e.g., using some specified algorithms) if a portion of the other data write overlaps an other interface between the other SSU to the RAID and an additional SSU of the RAID. In operation 710, the portion of the other data write that overlaps the other interface may be temporarily stored into the software cache (e.g., using the data buffer module (e.g., software cache module) 106 of FIG. 1). In operation 712, the portion of the other data write in the software cache may be appended (e.g., using the write module 110 of FIG. 1) to an additional data write.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the RAID module 102, the queue module 104, the data buffer module (e.g., software cache module) 106, the write module 110, the removal module 112, the de-duplication module 114 of FIG. 1-7 may be enabled using software and/or using transistors, logic gates, and electrical circuits (e.g., application specific integrated ASIC circuitry) such as a RAID module circuit, a queue circuit, a data buffer circuit (e.g., software cache circuit), a write circuit, a removal circuit, a de-duplication circuit, and other circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
   configuring a queue module to store, into a data buffer module associated with a storage device, an amount of data associated with a write operation to the storage device expected to incur a read-modify-write operation if the amount of data is succeeded by a non-sequential write associated with the write operation; and
   writing, as and when data following the amount of data arrives in a queue associated with the queue module, the amount of data from the data buffer module to the queue one of before and after a current write request to the storage device.

2. The method of claim 1, wherein the storage device is a redundant array of independent disks (RAID)-based unit.

3. The method of claim 1, wherein the data buffer module is a software cache module.

4. The method of claim 3, wherein the software cache module is implemented as a hash table.

5. The method of claim 2, wherein a number of sectors of the write operation is a non-multiple of a striped sector unit (SSU) value associated with the RAID-based unit.

6. The method of claim 5, further comprising algorithmically determining the amount of data to place in the data buffer module as a portion of the write operation expected to cross a boundary between an SSU and another SSU.

7. The method of claim 1, further comprising writing the amount of data from the data buffer module to the storage device.

8. The method of claim 1, further comprising writing data stored in the data buffer module to the storage device prior to serving an access request to the storage device.

9. The method of claim 8, further comprising:
   examining the data in the data buffer module for a set of data that duplicates another set of data associated with another write operation; and
   discarding the set of data that duplicates the another set of data of the another write operation from the data buffer module.

10. The method of claim 1, further comprising initiating, to the storage device, a transfer of data associated with the write operation excluding the amount of data.

11. The method of claim 1, further comprising:
    accumulating, when the storage device is a single disk system, each multiple write to a same sector of the storage device expected to incur a read-modify-write operation in the data buffer module; and
    writing, in a single operation, data associated with the each multiple write to the same sector to the storage device.

12. A system comprising:
    a RAID-based unit;
    a data buffer module;
    a queue module associated with the RAID-based unit to store, into the data buffer module, an amount of data associated with a write operation to the RAID-based unit expected to incur a read-modify-write operation if the amount of data is succeeded by a non-sequential write associated with the write operation; and
    a write module to write, as and when data following the amount of data arrives in a queue associated with the queue module, the amount of data from the data buffer module to the queue one of before and after a current write request to the RAID-based unit.

13. The system of claim 12, wherein the write module writes the amount of data stored in the data buffer module to a single striped sector unit (SSU) of the RAID-based unit.

14. The system of claim 12,
wherein the data buffer module uses a software cache implemented as a hash table to store the amount of data, and
wherein the RAID-based unit has an odd number of data disks.

15. The system of claim 12, wherein the write module is further configured to subsequently write the amount of data from the data buffer module to the RAID-based unit.

16. The system of claim 12,
wherein the write module is further configured to write data stored in the data buffer module to the RAID-based unit prior to serving an access request to the storage device.

17. The system of claim of 16,
a de-duplication module to examine the data buffer module for a set of data that duplicates another set of data associated with another write operation; and
a removal module to discard the set of data that duplicates the another set of data of the another write operation from the data buffer module.

18. The system of claim 12,
wherein RAID-based unit has a single data disk, and
wherein the data buffer module is configured to accumulate data associated with each multiple write to a same sector of the single data disk expected to incur a read-modify-write operation prior to a writing thereof to the single data disk in a single operation.

19. A method comprising:
determining if a portion of a data write overlaps an interface between an SSU to a RAID and another SSU of the RAID;
storing the portion of the data write that overlaps the interface into a software cache if the portion of the data write is succeeded by a non-sequential write; and
writing, as and when data following the portion of the data write arrives in a queue, the portion of the data write to the queue one of before and after a current write request to the storage device, the queue being associated with an order of servicing access requests to the RAID.

20. The method of claim 19, further comprising:
writing the portion of the data write from the queue to the RAID.

* * * * *